United States Patent [19]  [11] 4,431,568
Miya et al.  [45] Feb. 14, 1984

[54] CATALYST FOR POLYMERIZATION OF OLEFINS AND POLYMERIZATION PROCESS EMPLOYING SUCH CATALYST

[75] Inventors: Masayoshi Miya; Hisaya Sakurai; Tadashi Ikegami, all of Kurashiki, Japan

[73] Assignee: Asahi Kasei Kogyo Kabushiki Kaisha, Osaka, Japan

[21] Appl. No.: 331,103

[22] Filed: Dec. 15, 1981

[30] Foreign Application Priority Data

Dec. 25, 1980 [JP] Japan .............................. 55-182736

[51] Int. Cl.³ ............................ C08F 4/64; C08F 4/68
[52] U.S. Cl. .................................... 502/154; 526/124; 526/127; 526/128; 526/129
[58] Field of Search ..................................... 252/429 B

[56] References Cited

U.S. PATENT DOCUMENTS 3,094,568  6/1963  Hay et al. .................... 252/429 B X
3,738,944  6/1973  Candlin et al. ............. 252/429 B X
3,925,338  12/1975 Ort .............................. 252/429 B X
4,159,256  6/1979  Sakurai et al. .................. 252/429 B
4,159,963  7/1979  Sakurai et al. .................. 252/429 B
4,159,965  7/1979  Sakurai et al. .................. 252/429 B
4,252,670  2/1981  Caunt et al. ....................... 252/429 B Primary Examiner—Patrick Garvin
Attorney, Agent, or Firm—Sprung, Horn, Kramer & Woods

[57] ABSTRACT

A catalyst useful for polymerizing olefins which comprises a solid catalyst component [A] and an organometallic component [B], the solid catalyst component [A] being obtained by reacting (1) a solid inorganic oxide, (2) a hydrocarbon-soluble organomagnesium component of the general formula

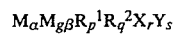
$M_\alpha Mg_\beta R_p^1 R_q^2 X_r Y_s$ wherein
α, p, q, r and s each independently is 0 or a number greater than 0,
β is a number greater than 0,
$p+q+r+s=m\alpha+2\beta$,
m is the valence of M,
M is a metal of the 1st to 3rd groups of the Periodic Table,
$R^1$ and $R^2$ each independently is a hydrocarbon group having 1 to 20 carbon atoms,
X and Y each independently is an $OR^3$, $OSiR^4R^5R^6$, $NR^7R^8$ or $SR^9$ group wherein $R^3$, $R^4$, $R^5$, $R^6$, $R^7$ and $R^8$ each independently is a hydrogen atom or a hydrocarbon group having 1 to 20 carbon atoms and $R^9$ is a hydrocarbon group having 1 to 20 carbon atoms, or of the reaction product of $M_\alpha Mg_\beta R_p^1 R_q^2 X_r Y_s$ with at least one electron donor selected from the group consisting of ethers, thioethers, ketones, aldehydes, carboxylic acids or derivatives thereof, alcohols, thioalcohols and amines and (3) a chlorosilane compound having a Si-H bond and of the formula

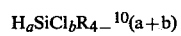
$H_a SiCl_b R_{4-(a+b)}^{10}$ wherein
$R^{10}$ is a hydrocarbon group having 1 to 20 carbon atoms,
$0 < a \leq 2$
$b > 0$ and
$a + b \leq 4$, separating a reaction product from the reaction mixture and washing the separated reaction product with an inert hydrocarbon and reacting the washed reaction product with (4) a titanium compound having at least one halogen atom and/or a vanadium compound having at least one halogen atom, and a polymerization process employing such a catalyst.

14 Claims, No Drawings

CATALYST FOR POLYMERIZATION OF OLEFINS AND POLYMERIZATION PROCESS EMPLOYING SUCH CATALYST

BACKGROUND OF THE INVENTION

1. Field of the Invention

This invention relates to a highly active catalyst for producing polyolefins having a good particle diameter distribution and to a polymerization process employing such a catalyst.

2. Description of the Prior Art

There have been developed and proposed many catalyst systems for low-pressure processes of producing polyolefins which comprise a transition metal compound of a metal of Groups IV to VI A of the periodic Table and an organometallic compound of a metal of Groups I to III of the Periodic Table since the Dr. Ziegler's discovery. Most of the catalyst systems, however, are not sufficient with the catalyst activity and require the step of removing catalyst residue from the polymer formed and accordingly, the cost of producing polymers are high. Recently, development of highly active catalysts capable of eliminating the step of removing catalyst residue from the polymer formed and simplifying the process to reduce the cost of producing polymers is extensively carried out and there has been proposed a group of catalysts employing the reaction products of inorganic magnesium compounds or organomagnesium compounds and titanium compounds or vanadium compounds.

It would be highly desired that the catalyst activity per transition metal atom in the catalyst is increased and at the same time all the characteristic features required for industrial catalysts, such as the particle diameter distribution of polymers, the bulk density of polymers and the stability of catalysts, are improved. At the present, a further increase in the catalyst activity in order to eliminate the catalyst residue removal step and at the same time a stable operation of slurry polymerization process continuously for a long period of time, and an improvement on the particle performances such as unification of the particle diameter of the polymer formed and increase in the bulk density of the polymer formed are considered very important from the industrial view point.

As one means for preparing catalysts having a high catalyst activity per transition metal atom, it is known to employ a solid catalyst component obtained by reacting a solid inorganic oxide with a transition metal. Japanese Patent Application (OPI) No. 2258/1971 describes a process for polymerizing olefins by employing a solid catalyst component obtained by firstly reacting silica with an alkylmagnesium halide and secondly reacting the resulting reaction product with a titanium compound. Japanese Patent Application (OPI) No. 92879/1975 describes a method of preparing a carrier catalyst by heating silica and a magnesium halide and adding a transition metal compound thereto. Further, Japanese Patent Application (OPI) No. 47990/1976 describes a method of preparing a solid catalyst component by firstly reacting a silicon compound synthesized by the high temperature process with an organomagnesium compound and secondly reacting the resulting reaction product with a titanium compound. Furthermore, Japanese Patent Application (OPI) No. 95790/1977 describes a method of obtaining a solid catalyst component by firstly contacting silica with an alcohol-soluble magnesium compound and a solution of a titanium halide and secondly vaporizing the alcohol to concentrate the reaction mixture solution. Still further, Japanese Patent Application (OPI) No. 148093/1979 describes a method of preparing a catalyst by dissolving a titanium compound and a magnesium compound in an electron donor and impregnating a porous carrier in the resulting solution. Also, Japanese Patent Application (OPI) No. 115405/1980 describes a method of preparing a catalyst comprising a solid inorganic oxide, an organomagnesium compound, a Lewis base compound and titanium tetrachloride.

According to these catalysts, the catalyst activity per transition metal atom is considerably high but the catalyst activity per unit weight of the solid catalyst component is not satisfactory. Thus, further improvements on the catalyst productivity of polymers and at the same time on the particle diameter distribution and the bulk density of the polymers formed are demanded.

As a result of the study on solid inorganic oxides, various organomagnesium compounds and various reagents in order to improve the above-described points, it has now been discovered that the solid substance obtained by reacting an inorganic oxide carrier substance, an inert hydrocarbon-soluble organomagnesium and a chlorosilane compound having a Si-H bond, separating and washing the reaction product with an inert hydrocarbon and reacting the reaction product with a transition metal compound, in combination with an organometallic compound, is a highly active catalyst for producing polyolefins having a good particle diameter.

SUMMARY OF THE INVENTION

According to this invention there is provided a catalyst useful for polymerizing olefins which comprises a solid catalyst component [A] and an organometallic component [B], the solid catalyst component [A] being obtained by reacting (1) a solid inorganic oxide, (2) a hydrocarbon-soluble organomagnesium component of the general formula

wherein
- α, p, q, r and s each independently is 0 or a number greater than 0,
- β is a number greater than 0,
- $p+q+r+s = m\alpha + 2\beta$,
- m is the valence of M,
- M is a metal of the 1st to 3rd groups of the Periodic Table,
- $R^1$ and $R^2$ each independently is a hydrocarbon group having 1 to 20 carbon atoms,
- X and Y each independently is an $OR^3$, $OSiR^4R^5R^6$, $NR^7R^8$ or $SR^9$ group wherein $R^3$, $R^4$, $R^5$, $R^6$, $R^7$ and $R^8$ each independently is a hydrogen atom or a hydrocarbon group having 1 to 20 carbon atoms and $R^9$ is a hydrocarbon group having 1 to 20 carbon atoms, or of the reaction product of $M_\alpha M_{g\beta} R_p^1 R_q^2 X_r Y_s$ with at least one electron donor selected from the group consisting of ethers, thioethers, ketones, aldehydes, hydrocarbyl carboxylic acids or derivatives thereof, alcohols, thioalcohols and amines and (3) a chlorosilane compound having a Si-H bond and of the formula

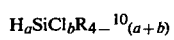

wherein
R$^{10}$ is a hydrocarbon group having 1 to 20 carbon atoms,
0<a≦2
b>0 and
a+b≦4,
separating a reaction product from the reaction mixture and washing the separated reaction product with an inert hydrocarbon and reacting the washed reaction product with (4) a titanium compound having at least one halogen atom and/or a vanadium compound having at least one halogen atom.

Also, according to this invention there is provided a process for polymerizing olefins by employing such a catalyst.

One of the characteristic features of this invention is a high catalyst efficiency per unit weight of the solid catalyst component [A] and moreover, a very high catalyst efficiency per chlorine atom in the solid catalyst component [A]. According to Japanese Patent Application (OPI) No. 40696/1978 there has been proposed a catalyst for polymerizing olefins which comprises (a) a solid catalyst component obtained by reacting a solid reaction product of a hydrocarbon-soluble organomagnesium component and a chlorosilane compound with a titanium or vanadium component and (b) an organometallic compound. The catalytic activity of this catalyst per transition metal atom and per unit weight of the solid catalyst component is high, but the catalyst efficiency per chlorine atom of the present invention is higher than that of Japanese Patent Application (OPI) No. 40696/1978 since the amount of chlorine atom contained in the solid catalyst component of this Japanese Patent Application is higher than that of the present invention. When the amount of chlorine atom remaining in the polymer is great, corrosion is caused on the metallic surface of molding apparatus. Thus it is preferred that the amount of chlorine atom is reduced as much as possible. In this respect the catalyst of the present invention is superior to the known catalysts.

Another characteristic feature of this invention is a high catalyst efficiency per transition metal atom.

Still another characteristic feature of this invention is that there can be obtained polymer powder having an excellent particle distribution and a high bulk density.

A further characteristic feature of this invention is that there can be produced polymers having a broad molecular weight distribution.

DETAILED DESCRIPTION OF THE INVENTION

Each of the component materials and the reaction conditions which can be employed for the preparation of the catalyst of this invention will now be described hereinafter in detail.

The solid inorganic oxide (1) which can be employed for the preparation of the solid catalyst component [A] is a carrier selected from silica, alumina and a composite containing silica and alumina. It is preferred to employ a carrier prepared especially for the use of a catalyst carrier, for example, the catalyst carrier suitable for the polymerization of ethylene by the known Philips method. It is also possible to employ any type of alumina which can be used as a catalyst carrier and preferably γ-alumina.

It is preferred that the carrier containing silica or alumina or both silica and alumina has a particle diameter of about 1–1000μ, a BET surface area of about 50–1000 m$^2$/g and a pore volume of about 0.3–3.5 ml/g. A more preferred is silica having an average particle diameter of about 20–300μ, a BET surface area of about 150–1000 m$^2$/g and a pore volume of about 0.5–2.0 ml/g.

It is preferred that the inorganic oxide carrier is substantially dry and does not contain physically-adsorbed water. Thus it is preferred that the inorganic oxide carrier is heat-treated at about 300° C. or higher temperatures for a given period of time under reduced pressure.

The organomagnesium component (2) which can be used in preparing the solid catalyst component [A] is represented by the general formula

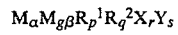

wherein M, R$^1$, R$^2$, X, Y, α, β, p, q, r and s are the same as defined above, and includes dihydrocarbyl magnesium R$_2$Mg wherein R is a hydrocarbon group and complexes of the dihydrocarbyl magnesium with other organometallic compounds.

In this formula R$^1$ and R$^2$ each independently is a hydrocarbon group having 1 to 20 carbon atoms. Exemplary hydrocarbon groups include alkyl groups such as methyl, ethyl, propyl, butyl, amyl, hexyl and decyl groups; cycloalkyl groups such as cyclohexyl group; aryl groups such as phenyl group; and aralkyl groups such as benzyl group. Of these groups, alkyl groups are preferred. M is a metal of the 1st to 3rd groups of the Periodic Table. Exemplary metals represented by M include lithium, sodium, potassium, beryllium, calcium, barium, zinc, boron and aluminum. Of these metals, beryllium, boron, aluminum and zinc are preferred due to their ease of making hydrocarbon-soluble organomagnesium complexes. The atomic ratio of Mg to M, i.e., β/α may be widely varied but it is preferred to employ the hydrocarbon-soluble organomagnesium complex in which the β/α ratio is 0.01 to 10. It is more preferred to employ the hydrocarbon-soluble organomagnesium complex in which α>0 and the β/α ratio is 1 to 10. X and Y each independently is an OR$^3$, OSiR$^4$R$^5$R$^6$, NR$^7$R$^8$ or SR$^9$ group where in R$^3$, R$^4$, R$^5$, R$^6$, R$^7$ and R$^8$ each independently is a hydrogen atom or a hydrocarbon group having 1 to 20 carbon atoms and R$^9$ is a hydrocarbon group having 1 to 20 carbon atoms. Exemplary hydrocarbon groups include alkyl groups such as methyl, ethyl, propyl, butyl, amyl, hexyl and decyl groups; cycloalkyl groups such as cyclohexyl group; aryl groups such as phenyl group; and aralkyl groups such as benzyl group. α, p, q, r and s each independently is 0 or a number greater than 0 and β is a number greater than 0 and the relationship of p+q+r+s=mα+2β wherein m is the valence of M is satisfied. This relationship shows stoichiometry between the valence of M plus Mg and the substitutents. A preferred range of 0≦(r+s)/(α+β)<1.0 designates that a total number of X and Y per total number of M and Mg is 0 to less than 1.0. It is more preferred to employ the range of 0≦(r+s)/(α+β)≦0.8.

The organomagnesium compounds or complexes can be prepared by reacting an organomagnesium compound of R$^1$MgQ or R$_2^1$Mg wherein R$^1$ is the same as defined above and Q is a halogen atom, with an organometallic compound of MR$_m^2$ or MR$_{m-1}^2$H wherein M, R$^2$ and m are the same as defined above, in an inert hydrocarbon medium such as hexane, heptane, cyclohexane, benzene and toluene at a temperature of about 0° C. to about 150° C., and, if necessary or if desired, further reacting the resulting reaction product with an alcohol, water, a siloxane, an amine, an imine, a thiol or a dithio compound. Furthermore, the organomagnesium compounds or complexes can be prepared by reacting a compound of $MgX_2$ or $R^1MgX$ with a compound of $MR_m^2$ or $MR_{m-1}^2H$ or by reacting a compound of $R^1MgX$ or $R_2^1Mg$ with a compound of $R_n^2MX_{m-n}$ or $Y_nMX_{m-n}$ wherein M, $R^1$, $R^2$, X, Y and m are the same as defined above and n is a number of 0 to m.

In general, organomagnesium compounds are insoluble in an inert hydrocarbon medium but organomagnesium complexes with $\alpha>0$ are soluble in an inert hydrocarbon medium.

Also organomagnesium compounds with $\alpha=0$ such as $(sec-C_4H_9)_2Mg$, $(C_2H_5)Mg(n-C_4H_9)$ and $(n-C_6H_{12})_2Mg$ are soluble in an inert hydrocarbon and accordingly, can be used in this invention with good results. Details will now be given of such organomagnesium compounds with $\alpha=0$.

The hydrocarbon-soluble organomagnesium compound of the formula $Mg_\beta R_p^1 R_q^2 X_r Y_s$ is one of the compounds shown in the following three categories:

(a) At least one of $R^1$ and $R^2$ is a secondary or tertiary alkyl group having 4 to 6 carbon atoms;

(b) $R^1$ and $R^2$ are alkyl groups having a different number of carbon atoms; and (c) At least one of $R^1$ and $R^2$ is a hydrocarbon group having 6 or more carbon atoms.

Preferred $R^1$ and $R^2$ are one of the following three combinations:

(a') $R^1$ and $R^2$ both are hydrocarbon groups having 4 to 6 carbon atoms and at least one of $R^1$ and $R^2$ is a secondary or tertiary alkyl group;

(b') $R^1$ is an alkyl group having 1 to 3 carbon atoms and $R^2$ is an alkyl group having 4 or more carbon atoms; and (c') $R^1$ and $R^2$ both are alkyl groups having 6 or more carbon atoms.

In the above described category of (a) and (a'), exemplary groups of the secondary or tertiary alkyl groups having 4 to 6 carbon atoms include $sec-C_4H_9$, $tert-C_4H_9$, $-CH(CH_3)(C_3H_7)$, $-CH(C_2H_5)_2$, $-C(C_2H_5)(CH_3)_2$, $-CH(CH_3)(C_4H_9)$, $-CH(C_2H_5)(C_3H_7)$, $-C(CH_3)_2(C_3H_7)$, $-C(CH_3)_2(C_3H_7)$ and $-C(CH_3)(C_2H_5)_2$. Of these groups, secondary alkyl groups are preferred and $sec-C_4H_9$ is more preferred.

In the category of (b) and (b'), ethyl and propyl are preferred alkyl groups having 1 to 3 carbon atoms and ethyl is more preferred. Exemplary alkyl groups having 4 or more carbon atoms include butyl, amyl, hexyl and octyl. Of these alkyl groups butyl and hexyl are preferred.

In the category of (c) and (c'), exemplary hydrocarbon groups having 6 or more carbon atoms include hexyl, octyl, decyl and phenyl. Of these hydrocarbon groups, alkyl groups are preferred and hexyl is more preferred.

Thus, exemplary hydrocarbon-soluble magnesium compounds of the formula $Mg_\beta R_p^1 R_q^2$ includes $(sec-C_4H_9)_2Mg$, $(tert-C_4H_9)_2Mg$, $(n-C_4H_9)Mg(C_2H_5)$, $(n-C_4H_9)Mg(sec-C_4H_9)$, $(n-C_4H_9)Mg(tert-C_4H_9)$, $(n-C_6H_{13})Mg(C_2H_5)$, $(n-C_8H_{17})Mg(C_2H_5)$, $(n-C_6H_{13})_2Mg$, $(n-C_8H_{17})_2Mg$ and $(n-C_{10}H_{21})_2Mg$.

In this invention it is essential that the organomagnesium compounds are soluble in an inert hydrocarbon medium.

Since with increased numbers of carbon atoms of the alkyl groups the organomagnesium component (2) becomes easily soluble in an inert hydrocarbon medium but the viscosity of the solution obtained tends to increase. Thus it is not advantageous from the viewpoint of ease of handling to employ unnecessarily long carbon chain alkyl groups.

The above described organomagnesium compounds can be used in the form of a solution and this solution may contain a small amount of a complexing agent such as an ether, an ester or an amine.

As the organomagnesium component (2), the above described compounds can be employed and it is preferred to react these compounds with an electron donor in the liquid phase.

The electron donors which can be employed in this invention include ethers, thioethers, ketones, aldehydes, hydrocarbyl carboxylic acids or derivatives thereof, alcohols, thioalcohols and amines which are well known compounds as the electron donor.

The ethers are represented by the general formula $R^{12}OR^{13}$ wherein $R^{12}$ and $R^{13}$ each is an aliphatic, aromatic or alicyclic hydrocarbon group having 1 to about 20 carbon atoms. Exemplary groups are methyl, ethyl, propyl, butyl, amyl, hexyl, decyl, octyl, dodecyl, cyclohexyl, phenyl and benzyl groups.

The thioethers are represented by the general formula $R^{14}SR^{15}$ wherein $R^{14}$ and $R^{15}$ each is an aliphatic, aromatic or alicyclic hydrocarbon group having 1 to about 20 carbon atoms. Exemplary groups are methyl, ethyl, propyl, butyl, amyl, hexyl, cyclohexyl and phenyl groups.

The ketones are represented by the general formula $R^{16}COR^{17}$ wherein $R^{16}$ and $R^{17}$ each is an aliphatic, aromatic or alicyclic hydrocarbon group having 1 to about 20 carbon atoms. Exemplary groups are methyl, ethyl, propyl, butyl, amyl, hexyl, cyclohecyl and phenyl groups, and dimethyl ketone and diethyl ketone are especially preferred.

The aldehydes are represented by the general formula $R^{18}CHO$ wherein $R^{18}$ is an aliphatic, aromatic or alicyclic hydrocarbon group having 1 to about 20 carbon atoms. Exemplary groups are methyl, ethyl, propyl, butyl, hexyl, cyclohexyl and phenyl groups.

The hydrocarbyl carboxylic acids or derivatives thereof are aliphatic, alicyclic or aromatic, saturated or unsaturated carboxylic acids where the number of carbon atoms of the carboxylic acids can vary widely and is preferably 1 to about 20, their acid anhydrides, their esters, their acid halides and their acid amides. Exemplary hydrocarbyl carboxylic acids include formic acid, acetic acid, propionic acid, butyric acid, valeric acid, oxalic acid, malonic acid, succinic acid, maleic acid, acrylic acid, benzoic acid, toluic acid and terephthalic acid. Exemplary hydrocarbyl carboxylic acid anhydrides include acetic anhydride, propionic anhydride, n-butyric anhydride, succinic anhydride, maleic anhydride, benzoic anhydride and phthalic anhydride. Among the hydrocarbyl carboxylic acid esters, it is preferred that the alcohol of the ester group has 1 to about 20 carbon atoms. Exemplary hydrocarbyl carboxylic acid esters include methyl or ethyl formate, methyl, ethyl or propyl acetate, methyl, ethyl, propyl or butyl propionate, ethyl butyrate, ethyl valerate, ethyl caproate, ethyl n-heptanoate, dibutyl oxalate, ethyl succinate, ethyl malonate, dibutyl maleate, methyl or ethyl acrylate, methyl methacrylate, methyl, ethyl, propyl or butyl benzoate, methyl, ethyl, propyl, butyl or amyl toluate, methyl, or ethyl p-ethylbenzoate, methyl, ethyl, propyl or butyl anisate and methyl or ethyl p-ethoxybenzoate. The hydrocarbyl carboxylic halides are preferably the carboxylic chlorides including, for example, acetyl chloride, propionyl chloride, butyryl chloride, succinoyl chloride, benzoyl chloride and toluyl chloride. Exemplary hydrocarbyl carboxylic acid amides include dimethyl formamide, dimethyl acetamide and dimethyl propionamide.

The alcohols are aliphatic, aromatic or alicyclic alcohols having 1 to about 20 carbon atoms. Exemplary alcohols include methyl alcohol, ethyl alcohol, propyl alcohol, butyl alcohol, amyl alcohol, hexyl alcohol, phenol and cresol. It is preferred to use sec- or tert-alcohols or aromatic alcohols including sec-propyl alcohol, sec-butyl alcohol, tert-butyl alcohol, sec-amyl alcohol, tert-amyl alcohol, sec-hexyl alcohol, phenol and o-, m- or p-cresol.

The thioalcohols are aliphatic, aromatic or alicyclic alcohols having 1 to about 20 carbon atoms. Exemplary thioalcohols include methyl mercaptan, ethyl mercaptan, propyl mercaptan, butyl mercaptan, amyl mercaptan, hexyl mercaptan and phenyl mercaptan. It is preferred to use sec-, tert- or aromatic thioalcohols.

The amines are aliphatic, alicyclic or aromatic amines having 1 to about 20 carbon atoms. It is preferred to use sec- or tert-amines including trialkylamines, triphenylamine and pyridine.

The reaction between the hydrocarbon-soluble organomagnesium component (2) and the electron donor is conducted in an inert reaction medium such as aliphatic hydrocarbons including hexane and heptane; aromatic hydrocarbons including benzene, toluene and xylene; alicyclic hydrocarbons including cyclohexane and methylcyclohexane; ethers; and any mixtures thereof.

The reaction order of these compounds is optional. For example, the electron donor is added to the organomagnesium component (2), or vice versa, or both components are simultaneously added to a reaction zone. In these reactions, the amount of the electron donor is not particularly limited, but preferably is at most about 1 mol, more preferably in the range of about 0.01 to about 0.8 mol, most preferably about 0.05 to about 0.5 mol per mol of the organomagnesium component (2).

Details will now be given of the chlorosilane compound (3) having a Si-H bond and of the formula

$H_aSiCl_bR^{10}_{4-(a+b)}$ wherein a, b and $R^{10}$ are the same as defined above. The hydrocarbon groups represented by $R^{10}$ have 1 to 20 carbon atoms and include aliphatic, alicyclic or aromatic hydrocarbon groups such as methyl, ethyl, propyl, butyl, amyl, hexyl, decyl, cyclohexyl and phenyl. Preferred hydrocarbon groups are alkyl groups having 1 to 10 carbon atoms, and lower alkyl groups such as methyl, ethyl, propyl are more preferred. The range of a and b is typically $0<a\leq2$, $b>0$ and $a+b\leq4$. A preferred range of a is $0<a<2$.

Exemplary chlorosilane compounds include $HSiCl_3$, $HSiCl_2(CH_3)$, $HSiCl_2(C_2H_5)$, $HSiCl_2(n-C_3H_7)$, $HSiCl_2(i-C_3H_7)$, $HSiCl_2(n-C_4H_9)$, $HSiCl_2(C_6H_5)$, $HSiCl_2(4-Cl-C_6H_4)$, $HSiCl_2(CH=CH_2)$, $HSiCl_2(CH_2C_6H_5)$, $HSiCl_2(1-C_{10}H_7)$, $HSiCl_2(CH_2CH=CH_2)$, $H_2SiCl(CH_3)$, $H_2SiCl(C_2H_5)$, $HSiCl(CH_3)_2$, $HSiCl(CH_3)(i-C_3H_7)$, $HSiCl(CH_3)(C_6H_5)$, $HSiCl(C_2H_5)_2$ and $HSiCl(C_6H_5)_2$. This compound alone, a mixture of these compounds or a mixture partially containing any of these compounds may be used. Preferred chlorosilane compounds are trichlorosilane, monomethyldichlorosilane, dimethylchlorosilane and ethyldichlorosilane. More preferred chlorosilane compounds are trichlorosilane and monomethyldichlorosilane.

Further details will now be provided of (4) the titanium compound having at least one halogen atom and/or a vanadium compound having at least one halogen atom.

Exemplary titanium compounds and vanadium compounds include halides, oxyhalides and alkoxyhalides of titanium or vanadium such as titanium tetrachloride, titanium tetrabromide, titanium tetraiodide, ethoxytitanium trichloride, propoxytitanium trichloride, butoxytitanium trichloride, dipropoxytitanium dichloride, dibutoxytitanium dichloride, tripropoxytitanium monochloride, tributoxytitanium monochloride, vanadium tetrachloride, vanadyl trichloride, monobutoxyvanadyl dichloride, dibutoxyvanadyl monochloride and dibutoxyvanadyl dichloride and mixtures thereof. Preferred titanium compounds and vanadium compounds are those having at least three halogen atoms, and titanium tetrahalides are more preferred.

Details will now be given to the preparation of the solid catalyst component [A].

The reaction of the solid inorganic oxide (1), the hydrocarbon-soluble organomagnesium component (2) and the chlorosilane compound (3) is conducted in an inert reaction medium such as aliphatic hydrocarbons such as hexane and heptane; aromatic hydrocarbons such as benzene, toluene and xylene; alicyclic hydrocarbons such as cyclohexane and methylcyclohexane; ethers such as ether and tetrahydrofuran; and mixtures thereof. Of these inert reaction media, aliphatic hydrocarbons are preferred from the viewpoint of catalyst performance.

As to the manner of the reaction, it can involve (i) reacting the component (2) and the component (3) in the presence of the component (1) [method (i)]; (ii) firstly reacting the component (1) with the component (2) to give a reaction product and then reacting the reaction product with the component (3) [method (ii)]; (iii) firstly reacting the component (1) with the component (3) to give a reaction product and then reacting the reaction product with the component (2) [method (iii)]. Of these methods, the two methods (i) and (ii) can provide better results.

According to the method (i), it is preferred that the solid inorganic oxide (1) is firstly suspended in an inert reaction medium to form a suspension and then the hydrocarbon-soluble organomagnesium component (2) and the chlorosilane compound (3) are simultaneously added into the suspension. The reaction ratio of the three components (1), (2) and (3) are not particularly limited but it is preferred that the mol ratio of the component (1):magnesium atom in the component (2):the component (3) is 1:about 0.01-100:about 0.01-100. A more preferred mol ratio of the component (1):magnesium atom in the component (2):the component (3) is 1:about 0.1-10:about 0.1-10. The reaction temperature is not particularly limited and typically ranges from about −25° C. to about 100° C. A preferred reaction temperature ranges from about 10° C. to about 60° C.

According to the method (ii), the reaction between the component (1) and the component (2) may be conducted by simultaneously introducing the two components (1) and (2) into a reaction zone; suspending the component (1) in an inert reaction medium and adding the component (2) to the resulting suspension; or adding the component (1) to the component (2). The former two methods can provide better results. The reaction ratio of the two components (1) and (2) is not particularly limited but it is preferred to employ about 0.01–100 mols, more preferably about 0.1–10 mols of the hydrocarbon-soluble organomagnesium component (2) per mol of the solid inorganic oxide (1). The reaction temperature is not particularly limited and typically ranges from about −25° C. to about 100° C. A preferred reaction temperature ranges from about 10° C. to about 60° C.

It is preferred that the reaction product of the component (1) and the component (2) is separated, washed with an inert hydrocarbon and then reacted with the component (3). The reaction between the reaction product and the component (3) may be conducted by simultaneously introducing the reaction product and the component (3) into a reaction zone or suspending the reaction product in an inert reaction medium and then adding the component (3) to the resulting suspension. The reaction ratio of the reaction product and the component (3) is not particularly limited but it is preferred to employ about 0.1–1000 mols, more preferably about 1–100 mols of the component (3) per mol of magnesium atom in the reaction product. The reaction temperature is not particularly limited but from the viewpoint of reaction rate the reaction is preferably carried out at a temperature of from about 40° C. to about 100° C.

According to the method (iii), the reaction between the component (1) and the component (3) may be conducted by simultaneously introducing the two components (1) and (3) into a reaction zone; suspending the component (1) in an inert reaction medium and adding the component (3) to the resulting suspension; or adding the component (1) to the component (3). Any of these three methods can provide good results. The reaction mole of the two components (1) and (3) is not particularly limited but it is preferred to employ about 0.01–100 mols, more preferably about 0.1–10 mols of the component (3) per mol of the component (1). The reaction temperature is not particularly limited but it is preferred to conduct the reaction at a temperature of from about 40° C. to about 100° C.

It is preferred that the reaction product of the component (1) and the component (3) is separated, washed with an inert hydrocarbon and then reacted with the component (2). The reaction between the reaction product and the component (2) may be conducted by simultaneously introducing the reaction product and the component (2) into a reaction zone or suspending the reaction product in an inert reaction medium and then adding the component (2) to the resulting suspension. The reaction ratio of the reaction product and the component (2) is not particularly limited but it is preferred to employ about 0.1–1000 mols, more preferably about 1–100 mols of the component (2) per mol of chlorine atom in the reaction product. The reaction temperature is not particularly limited and typically ranges from about 0° C. to about 100° C.

Now details will be given of the reaction between the reaction product of the solid inorganic oxide (1), the hydrocarbon-soluble organomagnesium component (2) and the chlorosilane compound (3) and a titanium compound having at least one halogen atom and/or a vanadium compound having at least one halogen atom (4).

It is preferred that the reaction product of the three components (1), (2) and (3) is separated, washed with an inert hydrocarbon and then reacted with the component (4). The reaction may be conducted by employing an inert reaction medium or by employing the undiluted titanium compound and/or vanadium compound (4) as such as the reaction medium without using an inert reaction medium. The inert reaction media which can be employed in this reaction include aliphatic hydrocarbons such as hexane and heptane; aromatic hydrocarbons such benzene, toluene and xylene; and alicyclic hydrocarbons such as cyclohexane and methylcyclohexane. Of these inert reaction media, aliphatic hydrocarbons are preferred. The reaction temperature employed is not particularly limited but it is preferred to employ a temperature of from about 40° C. to about 100° C. The concentration of the titanium compound and/or the vanadium compound (4) is not particularly limited but it is preferred that the concentration of the titanium compound and/or the vanadium compound (4) is at least about 4 mols per liter of the inert reaction medium. More preferably, undiluted titanium compound and/or vanadium compound (4) as such is employed as the reaction medium. As to the reaction ratio of the reaction product of the components (1), (2) and (3) and the component (4), good results can be obtained when the reaction is conducted in the presence of the titanium compound and/or the vanadium compound (4) in a sufficiently excess amount based on the magnesium atom in the reaction product of the components (1), (2) and (3).

The composition and the structure of the solid catalyst component [A] obtained by the above described reaction may vary depending upon the kinds of the starting materials and the reaction conditions and as a result of the composition analysis, it has been found that the solid catalyst component [A] contains about 0.3–10% by weight of titanium and/or vanadium and has a large surface area.

The organometallic compounds [B] which is employed with the solid catalyst component [A] are compounds of metals of the 1st to 3rd groups of the Periodic Table and include organoaluminum compounds, organomagnesium compounds and organozinc compounds. Of these organometallic compounds, organoaluminum compounds are preferred. As the organoaluminum compounds, those represented by the formula $AlR_t^{11}Z_{3-t}$ wherein
  $R^{11}$ is a hydrocarbon group having 1 to 20 carbon atoms,
  Z is a hydrogen atom, a halogen atom, an alkoxy group, an aryloxy group or a siloxy group and
  t is 2 or 3,
can be used individually or as a mixture. In the above described formula, the hydrocarbon groups having 1 to 20 carbon atoms represented by $R^{11}$ include aliphatic hydrocarbons, aromatic hydrocarbons and alicyclic hydrocarbons.

Exemplary organoaluminum compounds include trialkylaluminums such as triethylaluminum, tri-n-propylaluminum, triisopropylaluminum, tri-n-butylaluminum, triisobutylaluminum, trihexylaluminum, trioctylaluminum, tridecylaluminum, tridodecylaluminum, trihexadecylaluminum; dialkylaluminum hydrides such as diethylaluminum hydride, diisobutylaluminum hydride; dialkylaluminum alkoxides such as diethylaluminum ethoxide, diisobutylaluminum ethoxide, dioctylaluminum butoxide, diisobutylaluminum octyloxide; dialkylaluminum halides such as diethylaluminum chloride, diisobutylaluminum chloride; dialkylaluminum siloxides such as dimethylhydrosiloxyaluminum dimethyl, ethylmethylhydrosiloxyaluminum diethyl, ethyldimethylsiloxyaluminum diethyl; aluminum isoprenyl and mixtures thereof.

A combination of these organoaluminum compounds with the above described solid catalyst component [A] provides a highly active catalyst, and especially trialkylaluminums and dialkylaluminum hydrides are preferred because they show the highest activity.

The solid catalyst component [A] and the organometallic component [B] may be added to the polymerization system under the polymerization conditions or may be mixed prior to the polymerization.

The amount of the organometallic compound [B] typically ranges from about one millimol to about 3000 millimols per gram of the solid catalyst component [A].

The electron donor which can be employed as the catalyst component [C] may be the same as the one which can be employed for the reaction with the hydrocarbon-soluble organomagnesium component (2). Of the ethers, thioethers, ketones, aldehydes, hydrocarbyl carboxylic acids or derivatives thereof, alcohols, thioalcohols and amines, preferred electron donors are the hydrocarbyl carboxylic acids or derivatives thereof. The amount of the electron donor typically ranges from about 0.01 mol to about 10 mols, preferably ranges from about 0.1 mol to about 1 mol per mol of the organometallic compound [B].

The olefins which can be polymerized by using the present catalyst may be $\alpha$-olefins, especially ethylene. The present catalysts may be employed for stereospecific polymerization of propylene by using a combination of the organometallic compound with the electron donor. Also the present catalysts may be employed for polymerizing ethylene or propylene in the presence of other monoolefins such as propylene, butene-1 and hexene-1 and dienes such as butadiene and isoprene and moreover for polymerizing dienes.

As for the polymerization method, there may be employed the usual suspension-, solution- and gas phase-polymerizations. In the cases of suspension- and solution-polymerizations, the catalyst is introduced into a reactor together with a polymerization medium, e.g., aliphatic hydrocarbon such as hexane, or heptane; aromatic hydrocarbon such as benzene, toluene or xylene; or alicyclic hydrocarbon such as cyclohexane or methylcyclohexane, and, ethylene or propylene is added under a pressure of 1 to 20 Kg/cm$^2$ in an inert atmosphere and allowed to polymerize at a temperature from about room temperature to about 200° C. Polymerization of propylene can also be conducted in liquid propylene.

For gas phase-polymerization, it is possible to carry out polymerization under an ethylene or propylene pressure of 1 to 50 Kg/cm$^2$ and a temperature from about room temperature to about 120° C., using a fluidized bed, moving bed or mixing with a stirrer to provide better contact between the ethylene or propylene and catalyst.

There may be employed single stage polymerization or multistage polymerization.

The present catalyst makes it possible to prepare a polymer whose molecular weight distribution is considerably broad even in one stage polymerization. Furthermore, when multiple stage polymerization is effected in at least two polymerization zones having different polymerization conditions, by using the present catalyst it is possible to prepare a polymer whose molecular weight distribution is much broader. Such a polymer is very suitable for the production of articles by blow molding or film making.

In order to control the molecular weight of the polymer, it is also possible to add hydrogen, a halogenated hydrocarbon or an organometallic compound which can easily cause chain transfer.

The following examples of preferred embodiments further illustrate the principle and practice of the invention:

In the following examples,

MI is the melt index measured according to ASTM D-1238, wherein the temperature and the load employed are 190° C. and 2.16 Kg, respectively;

FR is the quotient of the melt high-load index measured at a temperature of 190° C. and a load of 21.6 Kg divided by MI; the larger the quotient, the broader is the molecular weight distribution;

Mesh is the one measured according to JIS Z8801-1966; and

Boiling n-heptane extraction residue is the residue obtained by extracting a polymer with boiling n-heptane for 6 hours.

EXAMPLE 1

(1) Treatment of Inorganic Oxide Carrier

Silica containing 99.5 percent by weight of $SiO_2$ and having a BET surface area of 365 m$^2$/g, a pore volume of 1.7 ml/g and an average particle diameter of 65$\mu$ was heated at 350° C. for 2 hours under reduced pressure and then cooled to room temperature and kept in a nitrogen atmosphere.

(2) Synthesis of Hydrocarbon-soluble Organomagnesium Component

In a 500 ml flask having been purged with nitrogen were charged 27.6 g of di-n-butylmagnesium and 3.80 g of triethylaluminum together with 200 ml of n-heptane, and the mixture was reacted at 80° C. for 2 hours to give an organomagnesium complex solution. As a result of analysis, the composition of this complex was $AlMg_{6.0}(C_2H_5)_{3.0}(n-C_4H_9)_{12.0}$ and the concentration of the organometal was 1.10 mol per liter of n-heptane.

(3) Synthesis of Solid Catalyst Component [A]

In a 200 ml flask equipped with a dropping funnel and a water-cooled reflux condenser from which oxygen and moisture had been removed by replacement with dry nitrogen, there were charged 5.0 g of the above-described heat-treated dry silica as obtained in (1) and then 20.8 cc of n-hexane to form a suspension with stirring. To the suspension formed were added dropwise 20.8 mmoles of the above-described organomagnesium complex solution as obtained in (2) and 20.8 cc of a n-hexane solution containing one mol of trichlorosilane per liter of n-hexane at the same time over one hour with stirring while the internal temperature of the flask was controlled at room temperature. The mixture was reacted at room temperature further for one hour. The solid formed was separated by filtration, sufficiently washed with n-hexane and dried.

In an autoclave having been purged with nitrogen were charged 2.0 g of the solid as obtained above and 30 ml of titanium tetrachloride, and the mixture was reacted at 130° C. for 2 hours with stirring. The solid formed was separated by filtration, sufficiently washed with n-hexane and dried to give a solid catalyst component [A]. As a result of analysis, the solid catalyst component [A] contained 1.9% by weight of Ti and 15.6% by weight of Cl.

(4) Polymerization of Ethylene

In a 1.5 l autoclave having been evacuated and purged with nitrogen were charged 20 mg of the solid component [A] as prepared in (3) and 0.4 mmol of triisobutylaluminum together with 0.8 l of dehydrated and deaerated n-hexane. While the internal temperature of the autoclave was maintained at 80° C., hydrogen and ethylene were pressured to 1.6 Kg/cm$^2$ and 2.4 Kg/cm$^2$, respectively, and the total guage pressure was adjusted to 4.4 Kg/cm$^2$. Polymerization of ethylene was carried out for one hour while the total gauge pressure of 4.4 Kg/cm$^2$ was maintained by supplying additional ethylene. The yield of polymer was 95 g and the catalyst efficiency was 104,000 g/g-Ti·hour·ethylene pressure. The polymer powder obtained shows a MI of 0.45, a FR of 81 and a bulk density of 0.430 g/cm$^3$. The particle distribution was as follows;

| Mesh | Weight % |
|---|---|
| <14 | 6.5 |
| 20 | 38 |
| 28 | 26.8 |
| 35 | 22.6 |
| 48 | 6.1 |

EXAMPLES 2 TO 10

Solid catalyst components [A] were prepared by using the same heat-treated dry silica as in Example 1. chlorosilane compounds, titanium compounds and/or vanadium compounds as described in Table in the same manner as in Example 1.

Polymerization of ethylene was carried out by using the solid catalyst components [A] under the same polymerization conditions as in Example 1. The results are shown in Table.

COMPARATIVE EXAMPLE 1

A solid catalyst component [A] was prepared in the same manner as in Example 1 except that ethylaluminum dichloride was employed instead of the trichlorosilane, and polymerization of ethylene was carried out by using the solid catalyst component [A] under the same conditions as in Example 1. The results are shown in Table.

TABLE

| | Preparation of Solid Catalyst Component [A] | | | |
|---|---|---|---|---|
| Example No. | Organamagnesium Component (2) 20.8 mmols | Chlorosilane Compound (3) 20.8 mmols | Titanium and/or Vanadium Compound (4) 30 ml | Analytical Amount of Ti and/or V (weight %) |
| 2 | AlMg$_{6.0}$(C$_2$H$_5$)$_{3.0}$(n-C$_4$H$_9$)$_{9.0}$(On-C$_4$H$_9$)$_{3.0}$ | HSiCl$_3$ | TiCl$_4$ | 1.8 |
| 3 | AlMg$_{6.0}$(C$_2$H$_5$)$_{3.0}$(n-C$_4$H$_9$)$_{9.0}$[OSiH(CH$_3$)(C$_2$H$_5$)]$_{3.0}$ | HSiCl$_2$(CH$_3$) | TiCl$_2$(n-C$_4$H$_9$)$_2$ | 2.0 |
| 4 | ZnMg$_{2.0}$(C$_2$H$_5$)$_{2.0}$(n-C$_4$H$_9$)$_{4.0}$ | HSiCl$_3$ | TiCl$_4$ | 1.4 |
| 5 | BeMg$_{4.0}$(C$_2$H$_5$)(n-C$_3$H$_7$)$_{6.0}$[N(n-C$_4$H$_9$)$_2$]$_{3.0}$ | HSiCl$_3$ | TiCl$_4$ + VCl$_4$ (mixture of equal mols) | 2.1 |
| 6 | BMg(C$_2$H$_5$)$_{3.0}$(n-C$_3$H$_7$)[S(C$_2$H$_5$)] | HSiCl$_2$(CH$_3$) | TiCl$_4$ | 1.7 |
| 7 | (sec-C$_4$H$_9$)$_2$Mg | HSiCl$_2$(CH$_3$) | VCl$_4$ | 1.5 |
| 8 | Mg(C$_2$H$_5$)(n-C$_4$H$_9$) | HSiCl$_3$ | TiCl$_4$ | 1.9 |
| 9 | AlMg$_{6.0}$(C$_2$H$_5$)$_{3.0}$(n-C$_4$H$_9$)$_{9.0}$(On-C$_4$H$_9$)$_{3.0}$ | HSiCl$_3$ | TiCl$_4$ + VOCl$_3$ (mixture of equal mols) | 1.9 |
| 10 | Mg(n-C$_6$H$_{13}$)$_2$ (butyl ether solution) | HSiCl$_3$ | TiCl$_4$ | 2.1 |
| Comparative Example 1 | AlMg$_{6.0}$(C$_2$H$_5$)$_{3.0}$(n-C$_4$H$_9$)$_{12.0}$ | Al(C$_2$H$_5$)Cl$_2$ | TiCl$_4$ | 7.9 |

| | Amount of Solid Catalyst | | Results of Polymerization | | | |
|---|---|---|---|---|---|---|
| Example No. | Component [A] (mg) | Organoaluminum Compound [B] 0.4 mmol | Yield (g) | Catalyst Efficiency (g/g-Ti and/or V · hour · pressure) | MI | FR |
| 2 | 20 | Al(i-C$_4$H$_9$)$_3$ | 90 | 104,000 | 0.30 | 73 |
| 3 | " | Al(C$_2$H$_5$)$_3$ | 85 | 88,500 | 0.27 | 61 |
| 4 | " | Al(C$_2$H$_5$)$_3$ | 64 | 95,200 | 0.41 | 68 |
| 5 | " | Al(C$_2$H$_5$)$_3$ | 50 | 49,600 | 0.33 | 71 |
| 6 | " | Al(i-C$_4$H$_9$)$_3$ | 57 | 69,900 | 0.19 | 79 |
| 7 | " | Al(i-C$_4$H$_9$)$_2$H | 77 | 107,000 | 0.35 | 82 |
| 8 | " | Al(C$_2$H$_5$)$_2$(OC$_2$H$_5$) | 71 | 77,900 | 0.45 | 65 |
| 9 | " | Al(C$_2$H$_5$)$_2$Cl | 48 | 62,500 | 0.31 | 73 |
| 10 | " | Al(C$_2$H$_5$)$_3$ | 86 | 85,300 | 0.50 | 69 |
| Comparative Example 1 | " | Al(i-C$_4$H$_9$)$_3$ | 31 | 8,180 | 0.35 | 49 |

EXAMPLE 11

In a 1.5 l autoclave having been purged with nitrogen were charged 10 mg of the same solid catalyst component [A] as prepared in Example 1 and 0.4 mmol of triethylaluminum as the organometallic component [B] together with 0.8 l of dehydrated and deaerated n-hexane. While the internal temperature of the autoclave was maintained at 80° C., hydrogen and ethylene were pressured to 3.8 Kg/cm$^2$ and 5.8 Kg/cm$^2$, respectively, and the total guage pressure was adjusted to 10.0 Kg/cm$^2$. Polymerization of ethylene was carried out for 2 hours while the total guage pressure of 10 Kg/cm$^2$ was maintained by supplying additional ethylene. The yield of polymer was 217 g. The amounts of Ti and Cl remaining in the polymer as the catalyst residue were 0.9 ppm and 7.2 ppm and thus the residual amount of Cl was especially small. The particle distribution of the polymer powder obtained was as follows;

| Mesh | Weight % |
|---|---|
| <14 | 41.0 |
| 20 | 22.8 |
| 28 | 25.7 |
| 35 | 8.5 |

The bulk density of the polymer powder was 0.415 g/cm$^3$ and the dry flow property of the powder was very good.

EXAMPLE 12

Gamma-alumina having a BET surface area of 315 m$^2$/g, a pore volume of 1.45 ml/g and a particle of 20 to 110$\mu$ was dried at 350° C. for 2 hours under reduced pressure in the same manner as in Example 1.

A solid catalyst component [A] was prepared by using 5.0 g of the above obtained gamma-alumina, 20.8 mmols of AlMg$_6$(C$_2$H$_5$)$_3$(n-C$_4$H$_9$)$_{12}$, 20.8 mmols of HSiCl$_3$ and 30 ml of TiCl$_4$ under the same reaction conditions as in Example 1. As a result of analysis, the solid catalyst component [A] contained 1.7% by weight of Ti.

Polymerization of ethylene was carried out by using the solid catalyst component [A] under the same polymerization conditions as in Example 1. The yield of polymer was 65 g and the catalyst efficiency was 79,700 g/g-Ti·hour·ethylene pressure. The polymer showed a MI of 0.29 and a FR of 76.

EXAMPLE 13

Silica having a BET surface area of 600 m$^2$/g, a pore volume of 1.0 ml/g and an average particle diameter of 58$\mu$ was dried at 350° C. for 2 hours under reduced pressure in the same manner as in Example 1.

In a 200 ml flask equipped with a dropping funnel and a water-cooled reflux condenser from which oxyten and moisture had been removed by replacement with dry nitrogen there were charged 5.0 g of the above-described heat-treated dry silica and then 20.8 cc of n-hexane to form a suspension with stirring. To the suspension formed was added dropwise 20.8 mmoles of the same organomagnesium component as obtained in Example 1 over one hour with stirring while the internal temperature of the flask was controlled at room temperature. The mixture was reacted at room temperature further for one hour. The solid formed was separated by filtration, washed with n-hexane and dried.

In an autoclave having been purged with nitrogen were charged the solid as obtained above and 20.8 cc of n-hexane to form a suspension with stirring. To the suspension was added dropwise 20.8 cc of a n-hexane solution containing one mol of trichlorosilane per liter of n-hexane at 60° C. over one hour with stirring, and the mixture was reacted at 60° C. further for one hour. The solid formed was separated by filtration, sufficiently washed with n-hexane and dried.

In an autoclave having been purged with nitrogen were charged 2.0 g of the above-described solid and 30 ml of titanium tetrachloride, and the mixture was reacted at 130° C. for 2 hours with stirring. The solid formed was separated by filtration to obtain a solid catalyst component [A]. As a result of analysis, the solid catalyst component [A] contained 2.0% by weight of Ti.

Polymerization of ethylene was carried out by using the solid catalyst component [A] under the same polymerization conditions as in Example 1. The yield of polymer was 82 g and the catalyst efficiency was 85,400 g/g-Ti·hour·ethylene pressure. The polymer showed a MI of 0.51 and a FR of 80.

EXAMPLE 14

Polymerization of a mixed gas of ethylene and butene-1 containing 3 mol % of butene-1 instead of ethylene was carried out by using the same catalyst as in Example 1 under the same polymerization conditions as in Example 1. The yield of polymer was 86 g and the polymer obtained showed a MI of 0.28 and a FR of 91.

EXAMPLE 15

In a 1.5 l autoclave having been evacuated, dried and filled with nitrogen were charged 30 mg of the same solid catalyst component [A] as prepared in Example 1, 2.4 mmols of triethylaluminum and 0.8 mmol of ethyl benzoate together with 0.8 l of dehydrated and deaerated n-hexane. While the internal temperature of the autoclave was maintained at 60° C., propylene was pressured to 5.0 Kg/cm$^2$. Polymerization of propylene was carried out for 2 hours while the total pressure was maintained at a gauge pressure of 4.8 Kg/cm$^2$. As a result, 131 g of a n-hexane insoluble polymer and 9.5 g of a n-hexane soluble polymer were obtained. The catalyst efficiency was 23,000 g/g-Ti·hour·propylene pressure and the boiling n-heptane extraction residue of the n-hexane insoluble polymer was 88.1%.

EXAMPLE 16

In a 1 l autoclave having been evacuated were charged 10 mg of the same solid catalyst component [A] as prepared in Example 1 and 0.1 mmol of tri-n-octylaluminum together with 0.6 l of dehydrated and deaerated n-octane. After 10 mmols of hydrogen was charged in the autoclave, ethylene was pressured into the autoclave at a pressure of 40 Kg/cm$^2$ while the temperature of the autoclave was maintained at 150° C. Polymerization of ethylene was carried out for 30 minutes while the total pressure was maintained constant by supplying additional ethylene. The yield of polymer was 88 g.

EXAMPLE 17

Gas phase polymerization was conducted by using a 50 l stainless steel fluidized bed type autoclave. Into the autoclave whose temperature was kept at 80° C. and whose gauge pressure was adjusted to 10 Kg/cm$^2$ were charged 100 ml of the same solid catalyst component [A] and 200 mmols of Al(n-C$_6$H$_{13}$)$_3$ and polymerization was carried out for one hour by introducing a mixed gas of ethylene, butene-1 and hydrogen at a mol ratio of 1:0.03:0.15 into the autoclave at a space velocity of 15 cm/second. As a result, there was obtained 953 g of a powder polymer having a bulk density of 0.423 g/cm$^3$, a true specific gravity of 0.934 g/cm³, a MI of 1.5 and a FR of 35.

EXAMPLE 18

In a flask from which oxygen and moisture had been evacuated and purged with dry nitrogen was charged 30 mmols of the same organomagnesium complex solution as in Example 1, and then 8 cc of a n-hexane solution containing one mol of ethyl benzoate per liter of n-hexane was added thereto at room temperature with stirring and the mixture was reacted at room temperature for one hour. In a flask was chraged 5 g of the same heat-treated dry silica as in Example 1, and then 20.8 cc of n-hexane was added thereto with stirring to form a suspension. To the suspension were added dropwise 20 cc of the above-described organomagnesium reaction solution and 20 cc of a n-hexane solution containing one mole of trichlorosilane per liter of n-hexane at the same time over one hour with stirring while the internal temperature of the flask was controlled at room temperature, and then the mixture was reacted at room temperature further for one hour. The solid formed was separated, washed with n-hexane, dried and reacted with titanium tetrachloride under the same reaction conditions as in Example 1 to give a solid catalyst component [A]. As a result of analysis, this solid catalyst component [A] contained 1.6% by weight of Ti and 14.2% by weight of Cl.

Polymerization of propylene was carried out by using 30 mg of the above-described solid catalyst component [A], 2.4 mmols of triethylaluminum and 0.8 mmol of ethyl p-toluate under the same polymerization conditions as in Example 15. The yields of a n-hexane insoluble polymer and a n-hexane soluble polymer were 126 g and 4.1 g, respectively. The catalyst efficiency was 26,300 g/g-Ti·hour·propylene pressure and the boiling n-heptane extraction residue of the n-hexane insoluble polymer was 93.1%. The particle distribution was as follows:

| Mesh | Weight % |
|------|----------|
| <14  | 9.6      |
| 20   | 28.1     |
| 28   | 35.0     |
| 35   | 27.3     |

The bulk density of the polymer powder obtained showed 0.435 g/cm³ and the dry flow property of the powder was very good.

EXAMPLE 19

In a 1.5 l autoclave having been purged with nitrogen and dried under vacuum was charged 350 g of liquid propylene. While the internal temperature of the autoclave was maintained at 60° C., polymerization of propylene was carried out for 2 hours at 60° C. by adding 10 mg of the same solid catalyst component [A] as prepared in Example 18, 1.5 mmols of triethylaluminum and 0.6 mmol of ethyl benzoate. The yield of polymer was 138 g. The catalyst efficiency was 6900 g·polypropylene/g·solid catalyst component·hour. The amounts of Ti and Cl remaining in the polymer as the catalyst residue were 1.2 ppm and 10.3 ppm and thus the residual amount of Cl was especially small. The boiling n-heptane extraction residue of the polypropylene obtained was 92.1% and the bulk density of the polymer powder was 0.440 g/cm³ and the dry flow property of the powder was very good.

It will be appreciated that instant specification and examples are set forth by way of illustration and not limitation, and that various modifications and changes may be made without departing from the spirit and scope of the present invention.

What is claimed is:

1. A catalyst useful for polymerizing olefins which comprises a solid catalyst component [A] and an organometallic component [B], the solid catalyst component [A] being obtained by reacting (1) a solid inorganic oxide, (2) a hydrocarbon-soluble organomagnesium component of the general formula

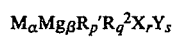
$$M_\alpha Mg_\beta R_p' R_q^2 X_r Y_s$$

wherein

α, p, q, r and s each independently is 0 or a number greater than 0,

β is a number greater than 0, p+q+r+s=mα+2β, m is the valence of M,

M is a metal of the 1st to 3rd groups of the Periodic Table, $R^1$ and $R^2$ each independently is a hydrocarbon group having 1 to 20 carbon atoms, X and Y each independently is an $OR^3$, $OSiR^4R^5R^6$, $NR^7R^8$ or $SR^9$ group wherein $R^3$, $R^4$, $R^5$, $R^6$, $R^7$ and $R^8$ each independently is a hydrogen atom or a hydrocarbon group having 1 to 20 carbon atoms and $R^9$ is a hydrocarbon group having 1 to 20 carbon atoms, or of the reaction product of $M_\alpha Mg_\beta R_p' R_q^2 X_r Y_s$ with at least one electron donor selected from the group consisting of ethers, thioethers, ketones, aldehydes, hydrocarbyl carboxylic acids or derivatives thereof, alcohols, thioalcohols and amines and (3) a chlorosilane compound having a Si-H bond and the formula

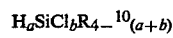
$$H_a SiCl_b R_4{-}^{10}{}_{(a+b)}$$

wherein $R^{10}$ is a hydrocarbon group having 1 to 20 carbon atoms, $0 < a \leq 2$ $b > 0$ and $a + b \leq 4$, separating a reaction product from the reaction mixture and washing the separated reaction product with an inert hydrocarbon and reacting the washed reaction product with (4) a titanium compound having at least one halogen atom and/or a vanadium compound having at least one halogen atom.

2. The catalyst of claim 1, wherein the reaction between (2) the hydrocarbon-soluble organomagnesium component or the reaction product of the hydrocarbon-soluble organomagnesium component with the electron donor and (3) the chlorosilane compound is carried out in the presence of (1) the solid inorganic oxide.

3. The catalyst of claim 1, wherein (1) the solid inorganic oxide is reacted with (2) the hydrocarbon-soluble organomagnesium component or the reaction product of the hydrocarbon-soluble organomagnesium component with the electron donor and the reaction product is separated from the reaction mixture, washed with an inert hydrocarbon and subsequently reacted with (3) the chlorosilane compound.

4. The catalyst of any of claims 1 to 3, wherein (1) the solid inorganic oxide is an inorganic oxide carrier selected from the group consisting of silica, alumina and a composite containing silica and alumina.

5. The catalyst of claim 4, wherein the solid inorganic oxide is silica having an average particle diameter of 1 to 1000μ, a BET surface area of 50 to 100 m²/g and a pore volume of 0.3 to 3.5 ml/g.

6. The catalyst of claim 1, wherein M in the hydrocarbon-soluble organomagnesium component (2) is beryllium, boron, aluminum or zinc metal.

7. The catalyst of claim 6, wherein M in the hydrocarbon-soluble organomagnesium component (2) is aluminum metal.

8. The catalyst of claim 1, wherein $\beta/\alpha$ in the hydrocarbon-soluble organomagnesium component (2) is 1 to 10.

9. The catalyst of claim 1, wherein in the hydrocarbon-soluble organomagnesium component (2) $\alpha$ is zero and (a) $R^1$ and $R^2$ both are alkyl groups having 4 to 6 carbon atoms and at least one of $R^1$ and $R^2$ is a secondary or tertiary alkyl group or (b) $R^1$ is an alkyl group having 1 to 3 carbon atoms and $R^2$ is an alkyl group having at least 4 carbon atoms or (c) $R^1$ and $R^2$ both are hydrocarbon groups having at least 6 carbon atoms.

10. The catalyst of claim 1, wherein in the hydrocarbon-soluble organomagnesium component (2) at least one of r and s is a number greater than zero.

11. The catalyst of claim 1, wherein a in the chlorosilane compound is $0<a<2$.

12. The catalyst of claim 1, wherein the titanium compound (4) is titanium tetrachloride.

13. The catalyst of claim 1, wherein the organometallic component [B] is an organoaluminum compound of the formula $$AlR_t^{11}Z_{3-t}$$

wherein
$R^{11}$ is a hydrocarbon group having 1 to 20 carbon atoms,
Z is a hydrogen atom, a halogen atom, an alkoxy group, an aryloxy group or a siloxy group and
t is 2 to 3.

14. The catalyst of claim 1 which additionally comprises an electron donor [C].

* * * * *